(12) United States Patent
Derenoncourt

(10) Patent No.: US 9,493,937 B2
(45) Date of Patent: Nov. 15, 2016

(54) RECYCLING FLUSH TOILET SYSTEM

(71) Applicant: Franck Derenoncourt, Montreal (CA)

(72) Inventor: Franck Derenoncourt, Montreal (CA)

( * ) Notice: Subject to any disclaimer, the term of this patent is extended or adjusted under 35 U.S.C. 154(b) by 268 days.

(21) Appl. No.: 14/533,751

(22) Filed: Nov. 5, 2014

(65) Prior Publication Data

US 2015/0345121 A1 Dec. 3, 2015

Related U.S. Application Data

(60) Provisional application No. 62/003,123, filed on May 27, 2014.

(51) Int. Cl.
| | |
|---|---|
| *E03D 5/016* | (2006.01) |
| *E03D 5/00* | (2006.01) |
| *E03D 5/01* | (2006.01) |
| *E03D 11/11* | (2006.01) |
| *B01D 35/027* | (2006.01) |

(52) U.S. Cl.
CPC ............ *E03D 5/016* (2013.01); *B01D 35/027* (2013.01); *E03D 5/003* (2013.01); *E03D 5/006* (2013.01); *E03D 5/01* (2013.01); *E03D 11/11* (2013.01)

(58) Field of Classification Search
CPC ....... E03D 5/016; E03D 5/003; E03D 5/006; E03D 5/01; E03D 11/11; B01D 35/027
USPC .......................... 4/317, 318, 321, 323, 111.6
See application file for complete search history.

(56) References Cited

U.S. PATENT DOCUMENTS

| | | | | |
|---|---|---|---|---|
| 4,271,539 | A * | 6/1981 | Roberts ................... | E03D 5/016 4/318 |
| 4,519,103 | A * | 5/1985 | De Graw ................ | E03D 5/016 4/318 |
| 5,400,443 | A * | 3/1995 | Marino ................... | E03D 11/11 4/111.5 |
| 2004/0148690 | A1* | 8/2004 | Freeman ................ | E03D 11/11 4/449 |

\* cited by examiner

*Primary Examiner* — Tuan N Nguyen

(57) ABSTRACT

A recycling flush toilet has a receptacle for human waste, a liquids holding tank, a base, a toilet pipe whose upper end is in fluid communication with the base of the toilet and extends downwards, a waste separation pipe extending out from the lower end of the toilet pipe, having a first end, wherein the lower end of the toilet pipe extends into the separation pipe near the first end, a filter at the lower end of the toilet pipe for separating solids and liquids, a solids container axially aligned, and in fluid communication, with the toilet pipe, and a liquids container in fluid communication with the separation pipe and adjacent to the solids container. The filter separates the waste into liquid and solid components that are disposed into the liquids and solids containers, respectively. Liquids within the liquids container are used to flush the toilet.

20 Claims, 18 Drawing Sheets

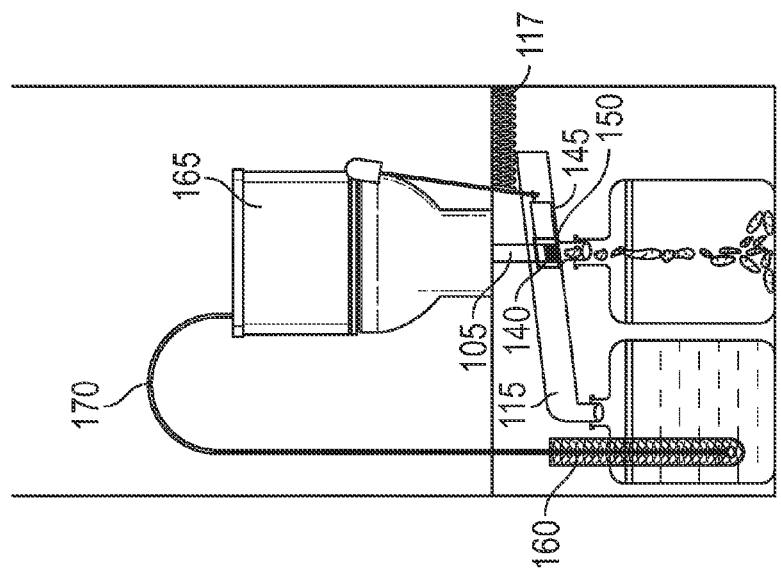
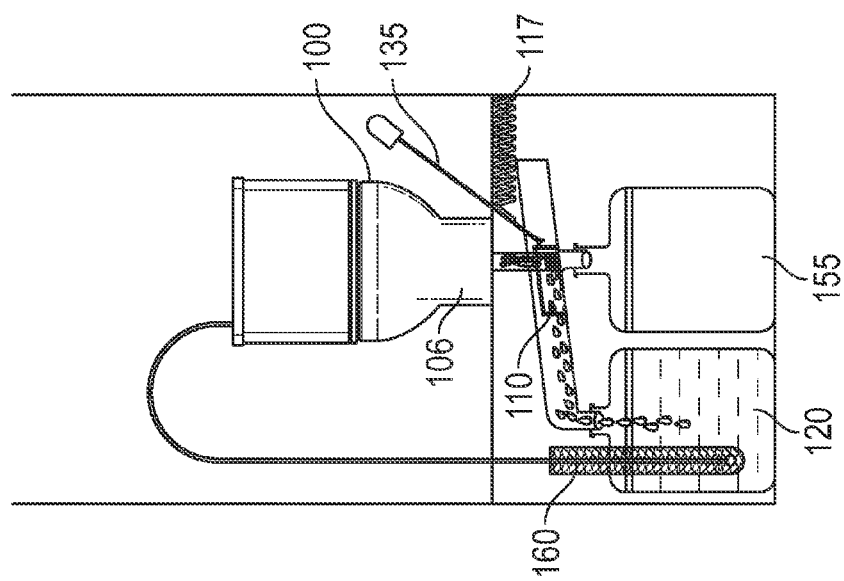

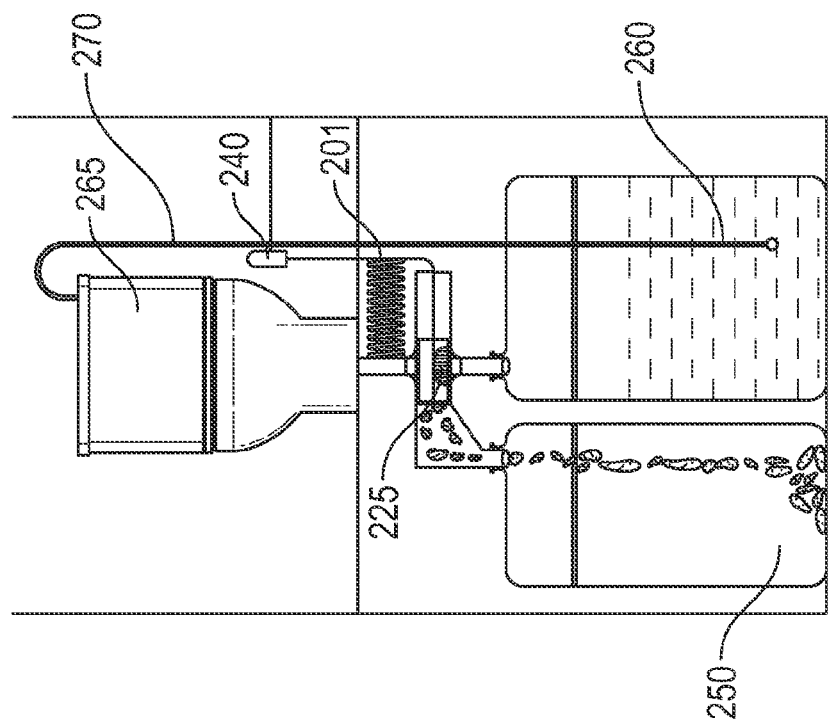
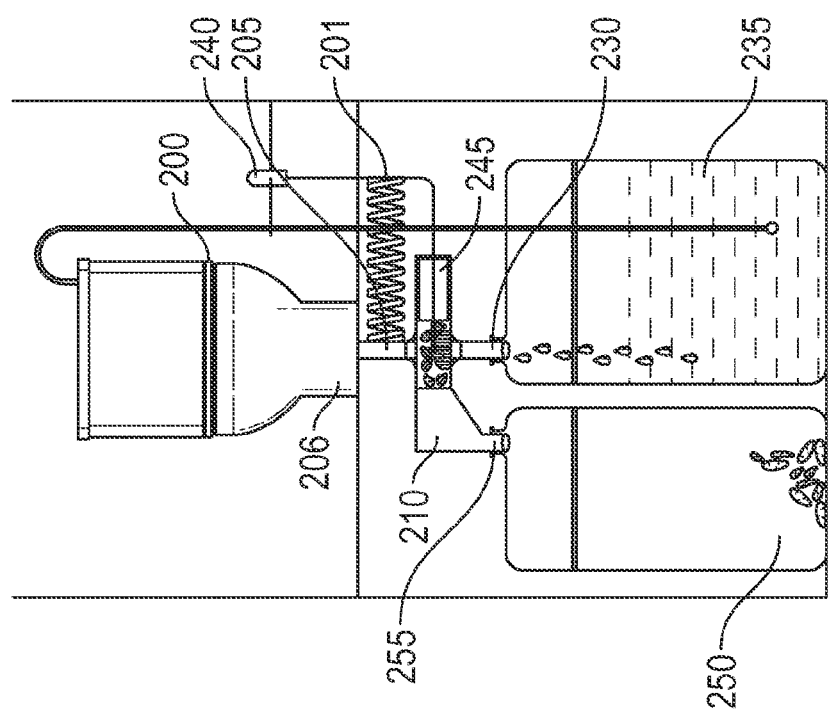

RECYCLING FLUSH TOILET SYSTEM

FIELD

The invention relates to the field of portable toilets, and more specifically to the field of portable recycling flush toilets.

BACKGROUND

Portable toilets are simple portable enclosures containing a chemical toilet, i.e. a toilet bowl filled with disinfectant mixed with water. Portable toilets generally use a smell-reducing chemical in the holding tank, because the waste is stored in an open-air holding tank, visible and accessible by the user. The chemicals used can be environmentally harmful and difficult to dispose of in an environmentally friendly fashion. Furthermore, because portable toilets are not plumbed, they keep the waste inside the toilet structure, creating a hygiene issue. Further, the decay of waste within the open holding tank can lead to a sewage smell if the portable toilet is not cleaned properly or is overused.

Commonly, portable toilets are paired on trailers known commonly as a "toilet trailer". However, this configuration has proven problematic, as most modern portable toilet waste tank designs have proven inadequate to deal with the common problem of splash-outs from the waste holding tank while being towed down bumpy roads.

Toilets having wall connection plumbing use a significant amount of water to flush the toilet. While convenient, in many areas of the world, water is a scarce resource, and traditional flushing can be very wasteful of such a precious resource. Further, wall plumbing is not always available. In these situations, portable toilets are a great alternative. However, portable toilets currently do not have a means for separating solid and liquid waste, nor is there a means to recycle liquids for reuse in flushing "luxury" portable toilets seen at wedding receptions and other more formal events. This deficiency necessitates more frequent waste disposal, and hence greater water consumption due to having to refill the holding tanks each time the waste is disposed of.

Based on the foregoing, there is a need in the art for a portable toilet that is more hygienic and, less dependent on chemicals for odor control and allows for efficient maintenance, repair and disposal of waste. Further, there is a need for a portable toilet that reduces water consumption while providing the same quality of comfort and cleanliness as a standard plumbed toilet. Finally, there is a need for a means to reduce splash-out when transporting portable toilets. Among other results, bad management of human waste can cause life threatening diseases like cholera outbreaks in Haiti recently and in London in the mid $19^{th}$ century.

SUMMARY

A recycling flush toilet has a receptacle for human waste, a liquids holding tank, a base, a toilet pipe with a lower end and an upper end that is in fluid communication with the base of the toilet and extends downwards, a waste separation pipe extending out from the lower end of the toilet pipe, having a first end, wherein the lower end of the toilet pipe extends into the separation pipe near the first end, a filter at the lower end of the toilet pipe for separating solids and liquids, a solids container axially aligned, and in fluid communication, with the toilet pipe, and a liquids container in fluid communication with the separation pipe and adjacent to the solids container. The filter separates the waste into liquid and solid components that are disposed into the liquids and solids containers, respectively. Liquids within the liquids container are used to flush the toilet.

In another embodiment, the recycling flush toilet has a slidable tray that is in fluid communication with the lower end of the toilet pipe and a handle that is connected to the tray that moves the tray laterally from a liquids evacuation position blocking the lower end of the toilet pipe, to a solids evacuation position in which the tray is no longer blocking the lower end of toilet pipe.

In another embodiment, the recycling flush toilet has a solids evacuation pipe with an upper end and a lower end that is axially aligned with the toilet pipe, wherein the upper end extends downward from within the waste separation pipe, and the lower end extends into the solids container, a slidable tray that is in fluid communication with the upper end of the solids evacuation pipe, and a handle connected to the tray for manipulating the movement of the tray. The tray is movable from a liquids evacuation position blocking the upper end of the solids evacuation pipe to a solids evacuation position wherein the tray is no longer blocking the upper end of solids evacuation pipe.

In another embodiment, the recycling flush toilet has a solids evacuation pipe with an upper end and a lower end that is axially aligned with the toilet pipe, wherein the upper end extends downward from within the waste separation pipe, and the lower end extends into the solids container, and a liquids evacuation pipe having an upper end and a lower end, wherein the upper end extends downward from within the waste separation pipe, and the lower end extends into the liquids container. Both the solids evacuation pipe and the liquids evacuation pipe can be disconnected from both the waste separation pipe and the solids and liquids containers, respectively.

In another embodiment of the recycling flush toilet, when in the liquids evacuation position the solids are contained within the lower end of the toilet pipe while the liquids pass through the filter and into the liquids container. The solids are disposed into the solids container in the solids evacuation position.

In another embodiment of the recycling flush toilet the tray is biased to a liquids evacuation position, and when the handle is pulled, the tray slides to a solids evacuation position, and once the handle is released, the handle returns to the liquids evacuation position.

In another embodiment, the recycling flush toilet has a filter within the liquids container for filtering liquid moving from the liquids container to the holding tank where chemical products are added to treat the used water.

In another embodiment, the recycling flush toilet has a manual or electrical powered water pump for pumping liquid from the liquids container to the holding tank.

In another embodiment of the recycling flush toilet the upper end of the toilet pipe can be disconnected from the lower end of the toilet pipe, and the lower end of the toilet pipe can be disconnected from the waste separation pipe, and the waste separation pipe can be disconnected from the solids and liquids containers.

In another embodiment, the recycling flush toilet has a removable waste liner within the solids container.

In another embodiment of the recycling flush toilet the ends of the waste separation pipe can be disconnected from the waste separation pipe.

In another embodiment of the recycling flush toilet the filter is a mechanical filter such as axially aligned slits around the circumference of the lower end of the toilet pipe, small holes around the lower end of the toilet pipe, a sieve, a mesh or a netting.

In another embodiment, the recycling flush toilet has a portable structure around the toilet for concealing at least one recycling flush toilet.

In another embodiment of the recycling flush toilet the fluids holding tank is mounted on a building roof, and the liquids and solids containers are fixed within the base of the building, and the toilet pipe is connected to the toilets within the building. When the toilets are flushed, the waste enters the toilet pipe and the waste is separated into liquids and solids.

In another embodiment of the recycling flush toilet as described in the preceding paragraph, the waste is separated in each toilet before entering separate liquids and solids pipes.

In another embodiment, a recycling flush toilet has a receptacle for human waste, a liquids holding tank for flushing the receptacle, a base for supporting the receptacle, a toilet pipe with an upper end and a lower end, wherein the upper end is in fluid communication with the base of the toilet and extends downwards, a filter at the lower end of the toilet pipe for separating solids and liquids, a solids container aligned with the toilet pipe, a liquids container adjacent to the solids container, a box extending out from the lower end of the toilet pipe with an open end, wherein the lower end of the toilet pipe extends into a hole in the top of the box near the open end, and wherein another hole in the bottom of the box is aligned with the liquids container, and wherein another hole in the bottom of the box is aligned with the toilet pipe and the solids container, and a slidable tray in fluid communication with the lower end of the toilet pipe within the box for blocking solid waste within the toilet pipe while liquids pass through the filter. Once the fluids have drained, the tray is moved out of the box to unblock the toilet pipe, allowing the solid waste to be disposed in to the solids container.

In another embodiment of the recycling flush toilet the filter has a cut away hose pipe facing the solids container having a separator in between configured to stop liquids from going into the solids container. When the cut away is blocked by the separator, the solids are captured inside the pipe while the liquids go directly to the related container.

In another embodiment, the recycling flush toilet has a garbage bag inside the solids container in order to better manage human waste. The waste can be burned, collected as domestic garbage for city garbage collection or compost as fertilizers, and can be handled by a public or private recycling facility where citizens can switch their solids container for a new one at a competitive price.

In another embodiment of the recycling flush toilet the toilet forms a sealed system to avoid lingering odors and negative visual impacts of a blue portable latrine.

In another embodiment, a recycling flush toilet has a receptacle for human waste, a liquids holding tank for flushing the receptacle, a base for supporting the receptacle, a toilet pipe having an upper end and a lower end, wherein the upper end is in fluid communication with the base of the toilet and extends downwards, a waste separation pipe extending out from the lower end of the toilet pipe, having a first end, wherein the lower end of the toilet pipe extends into the separation pipe near the first end, a liquids container axially aligned and in fluid communication with the toilet pipe, a solids container in fluid communication with the separation pipe and adjacent to the liquids container, a solids evacuation pipe having an upper end and a lower end that is axially aligned with the toilet pipe and extends downward from within the waste separation pipe into the solids container, a filter at the upper end of the solids evacuation pipe for separating solids and liquids, a cylinder element within the waste separation pipe having squeegee elements affixed around its circumference, wherein the squeegee elements sealingly engage with the interior walls of the waste separation pipe and a handle connected to the cylinder element, configured to manipulate the movement of the cylinder element back and forth through the waste separation pipe. The filter separates the human waste into liquid and solid components, and once the liquid component is disposed into the liquids container, the solids are disposed into the solids container by moving the cylinder element through the waste separation pipe toward the solids container.

DESCRIPTION OF FIGURES

FIG. 3A shows a transparent front elevation view of a recycling flush toilet in the liquids evacuation position according to an embodiment of the present invention.

FIG. 3B shows a transparent front elevation view of a recycling flush toilet in the solids evacuation position according to an embodiment of the present invention.

FIG. 4A shows a transparent front elevation view of a recycling flush toilet in the liquids evacuation position according to an embodiment of the present invention.

FIG. 4B shows a transparent front elevation view of a recycling flush toilet in the solids evacuation position according to an embodiment of the present invention.

DETAILED DESCRIPTION

With reference to FIGS. 1A through 1D, the recycling flush toilet 2 is situated inside of an enclosed structure 1A that is accessible via steps 1E leading up to a lockable door 1F. With further reference to FIG. 2E, inside of the structure, the toilet 2 is attached to a toilet pipe 2A that extends through the floor 2B to a separate compartment 2F that contains both a solids container 2C and a liquids container 2D. The compartment 2F that houses the solids and liquids containers 2C, 2D, respectively, is located directly beneath the toilet 2 and is readily accessible via doors 2E on the side or back of the structure. This allows for easy and quick access for regular maintenance and removal of waste.

The separate compartment 2F holds the solids and liquids containers 2C, 2D, respectively, to create an essentially sealed environment capable of reducing odors, eliminating splash-out and containing the negative visual effects of human waste.

Figure 1A:
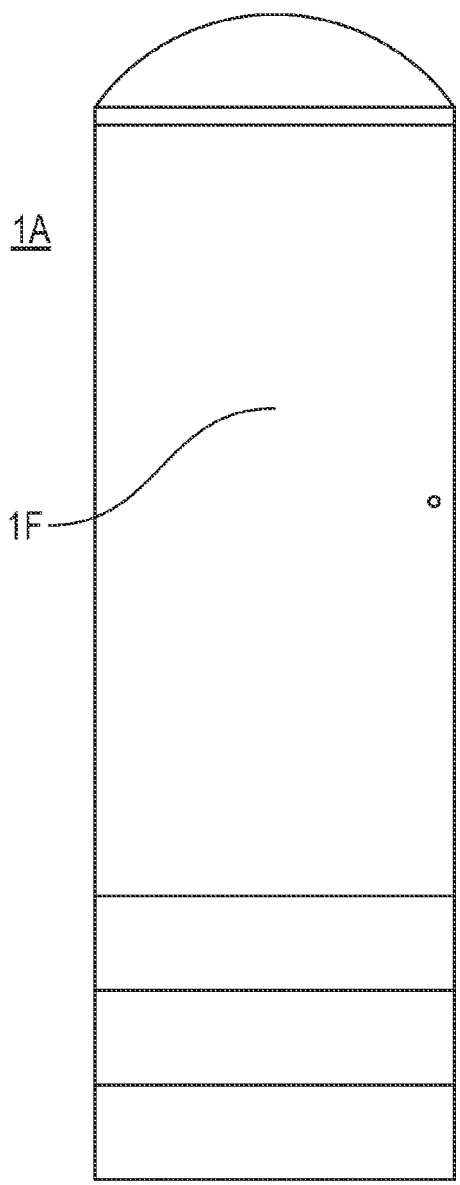
FIG. 1A shows a front elevation view of a structure for housing a recycling flush toilet according to an embodiment of the present invention.
Figure 1B:
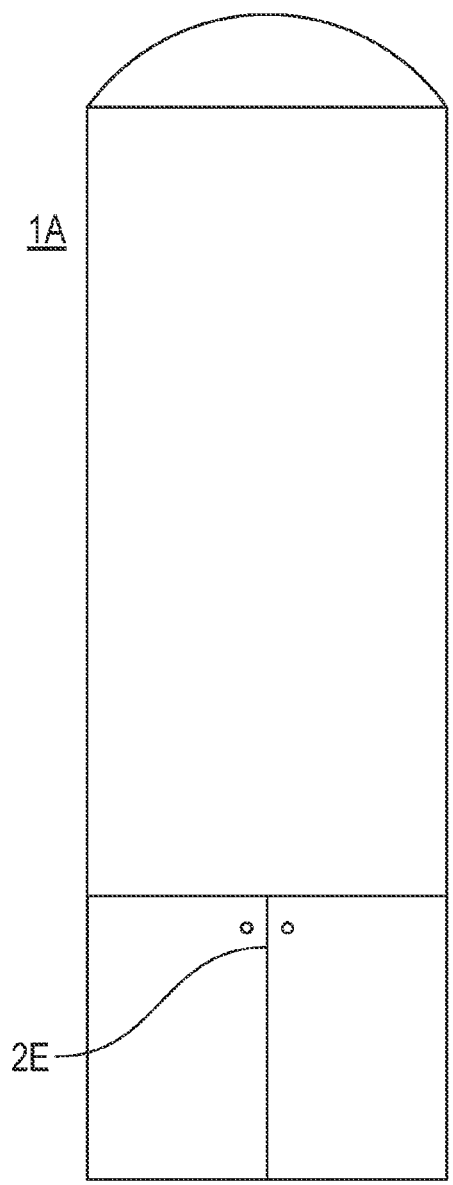
FIG. 1B shows a rear elevation view of a structure for housing a recycling flush toilet according to an embodiment of the present invention.
Figure 1C:
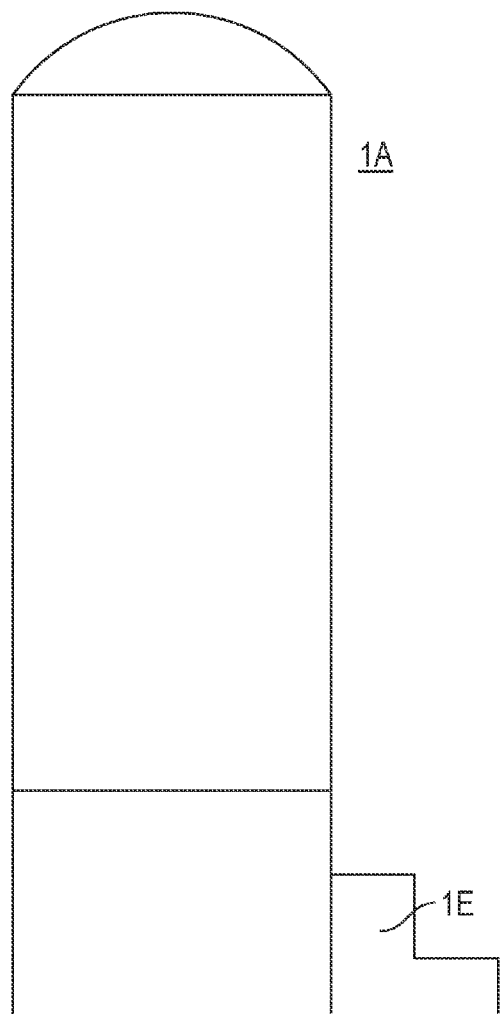
FIG. 1C shows a side elevation view of a structure for housing a recycling flush toilet according to an embodiment of the present invention.
Figure 1D:
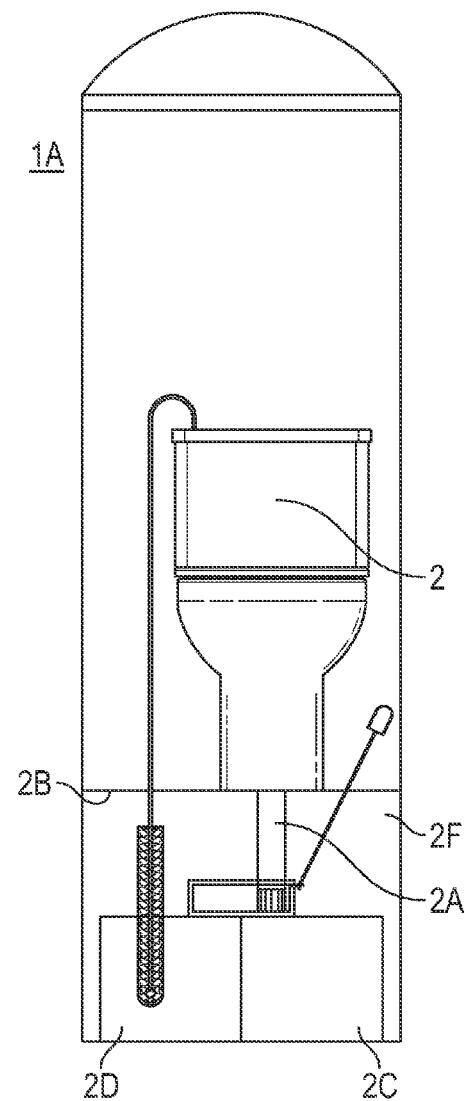
FIG. 1D shows a transparent front elevation view of a recycling flush toilet within a structure for housing the recycling flush toilet according to an embodiment of the present invention.
Figure 1E:
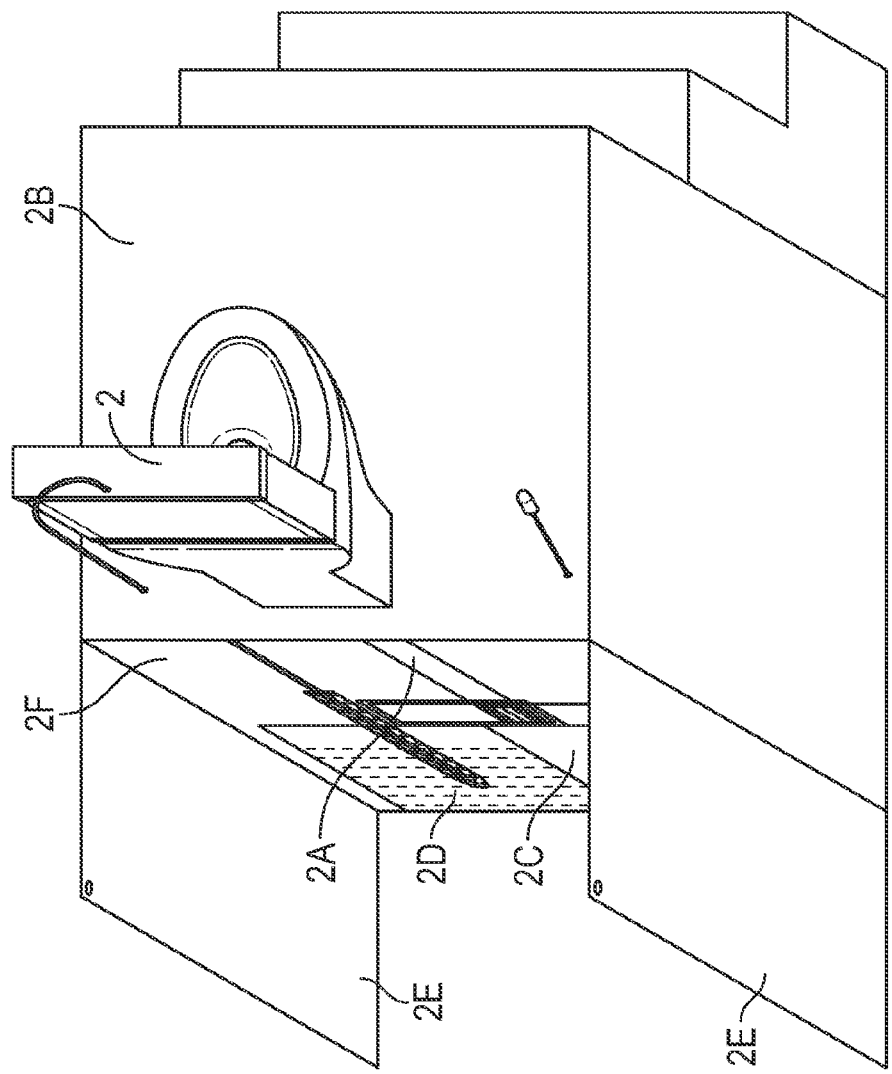
FIG. 1E shows a cut-away perspective view of a recycling flush toilet according to an embodiment of the present invention.
Figure 1F:
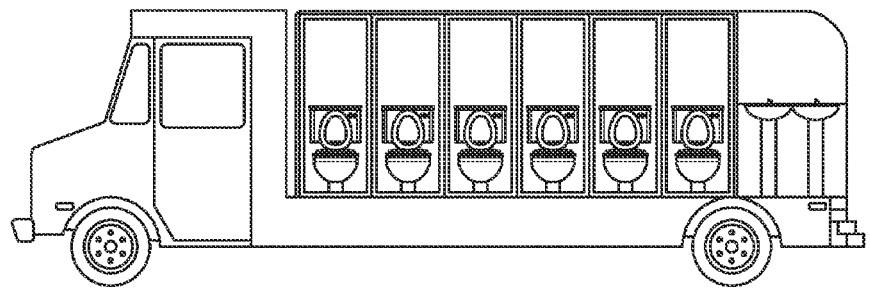
FIG. 1F shows a transparent side elevation view of an alternative configuration for a recycling flush toilet according to an embodiment of the present invention.
Figure 1G:
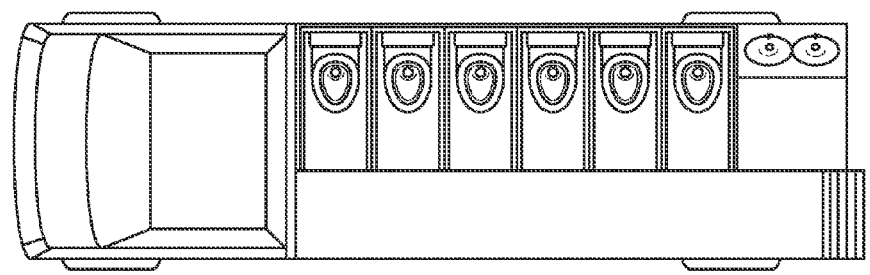
FIG. 1G shows a transparent top plan view of an alternative configuration for a recycling flush toilet according to an embodiment of the present invention.
Figure 1H:
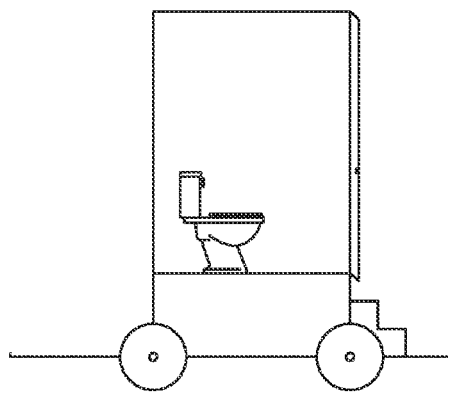
FIG. 1H shows a transparent side elevation view of an alternative configuration for a recycling flush toilet according to an embodiment of the present invention.
Figure 1I:
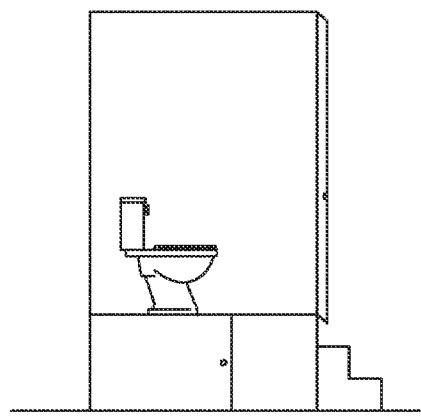
FIG. 1I shows a transparent side elevation view of an alternative configuration for a recycling flush toilet according to an embodiment of the present invention.
Figure 1J:
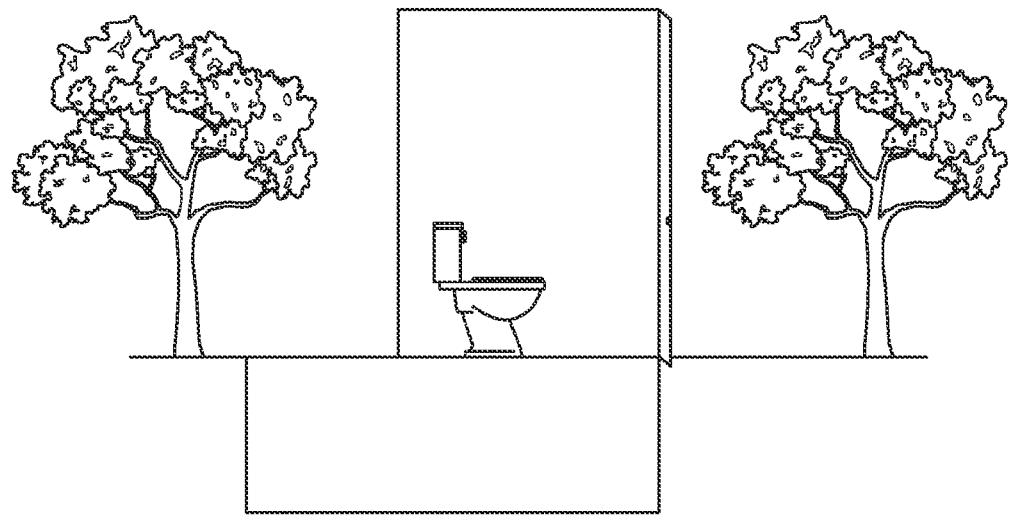
FIG. 1J shows a transparent side elevation view of an alternative configuration for a recycling flush toilet according to an embodiment of the present invention.

With reference to FIG. 1F-1J, the recycling flush toilet 2 can be used in a number of various situations and configurations including, for example, in FIGS. 1F and 1G, on buses having multiple toilets for rapid deployment to an area requiring facilities. A further example is FIG. 1H wherein the toilet is on a wheeled pedestal, in army camps in FIG. 1I, and in remote areas alongside highways and in construction and industrial sites in FIG. 1J.

With reference to FIGS. 2A through 2G, an embodiment of the recycling flush toilet 5 is shown. A toilet pipe 10 is connected to the base 6 of the toilet 5, wherein it is in communication with the lower drain (not shown) of the toilet that the wax ring (not shown) typically connects to, and extends downward from the toilet 5 into a hollow box 15 or pipe via a hole 20 in the top of the box 15. The box 15 has a first end 25 and a second end 55, wherein the first end 25 is open and the second end 55 is closed, and wherein the first end 25 is adjacent to the toilet pipe 10. The first end 25 is slightly elevated, creating a downward slope from the first end 25 to the second end 55. The first end 25 is configured to accept a tray 30, wherein the tray 30 is manipulated by pulling and releasing a handle 35, causing the tray to slide in and out of the box 15, transitioning the toilet from a liquids evacuation position (see FIG. 2A) to a solids evacuation position (see FIG. 2B). The handle 35 is hingedly connected to the end 40 of the tray 30 adjacent to the box' first end 25, so that when force is applied to the handle 35 the tray 30 moves. There is a hole 45 in the tray floor 50 near the end of the tray 30 adjacent to the box' second end 55. Further, there is a first hole 60 and a second hole 65 in the box floor 70, wherein the first hole 60 is adjacent to the box' second end 55 and is axially aligned with the hole 45 in the tray floor 50 when the tray 30 is in the liquids evacuation position, and wherein the second hole 65 is adjacent to the open end 25 of the box 15 and is axially aligned with both the hole 45 in the tray floor 50 and the toilet pipe 10 when the tray 30 is in the solids evacuation position. The lower end 75 of the toilet pipe 10 terminates at the tray floor 50, creating a flush fitment between the toilet pipe 10 and the tray floor 50. In an embodiment, the tray floor 50 is configured with a guide slot to assist with the alignment of the tray floor 50 and toilet pipe 10. The wall of the lower end 75 of the toilet pipe 10 has a filtration element 80 such as slits, mesh, sieves, screening or some other form of mechanical filtration means. In an embodiment the filtration element 80 is removably attached to the toilet pipe 10 and is disposable and replaceable. In another embodiment, a screen filter uses a backwash cycle to clean the filter, wherein the fluid is passed through the filter in a reverse direction to clean the filter. One skilled in the art would appreciate that other mechanical filters could be substituted while remaining within the scope of the invention.

Figure 2A:
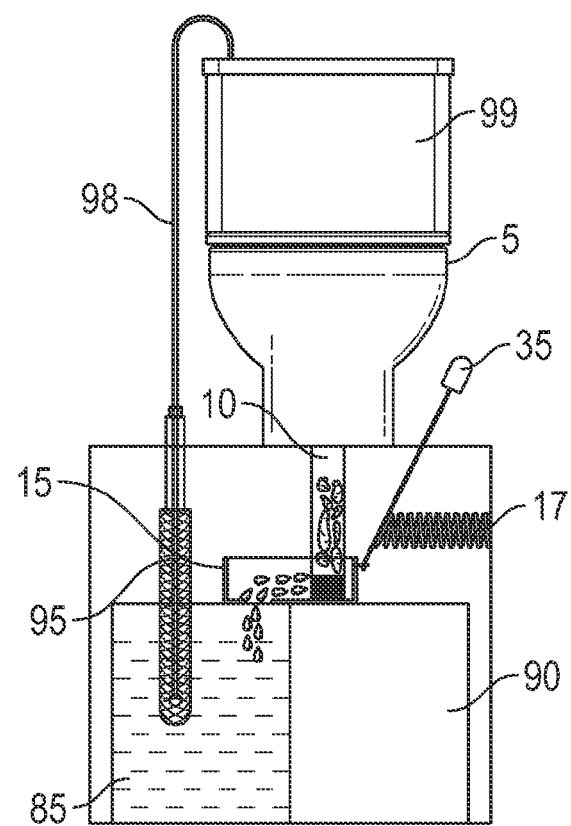
FIG. 2A shows a transparent front elevation view of a recycling flush toilet in the liquids evacuation position according to an embodiment of the present invention.
Figure 2B:
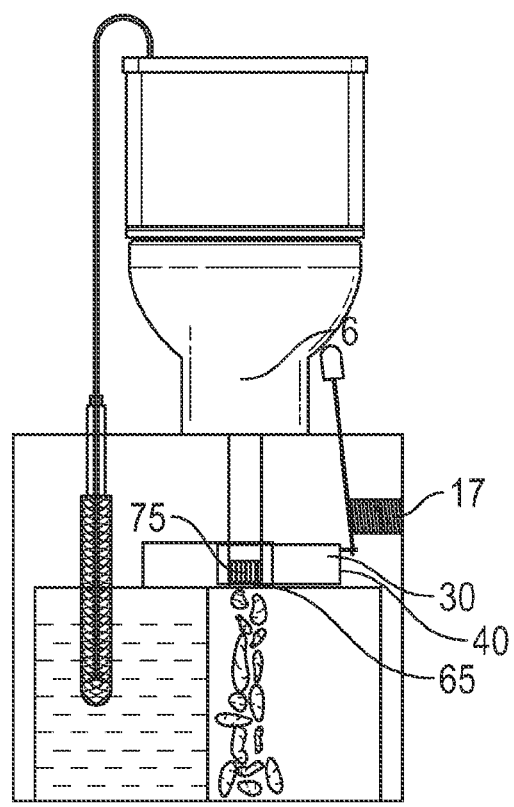
FIG. 2B shows a transparent front elevation view of a recycling flush toilet in the solids evacuation position according to an embodiment of the present invention.
Figure 2C:
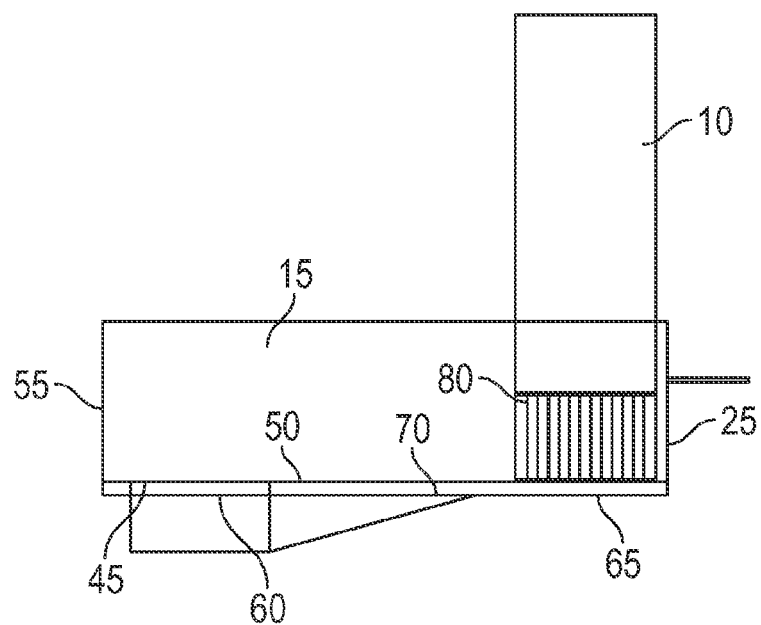
FIG. 2C shows a transparent front elevation view of the waste separation mechanism of a recycling flush toilet according to an embodiment of the present invention.
Figure 2E:
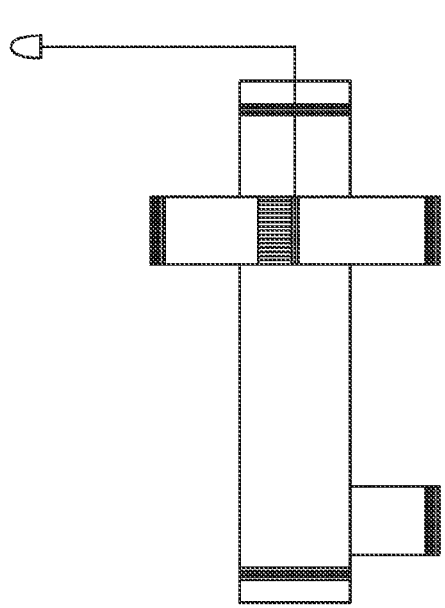
FIG. 2E shows a top plan view of the waste separation mechanism of a recycling flush toilet in a solids evacuation position according to an embodiment of the present invention.
Figure 2G:
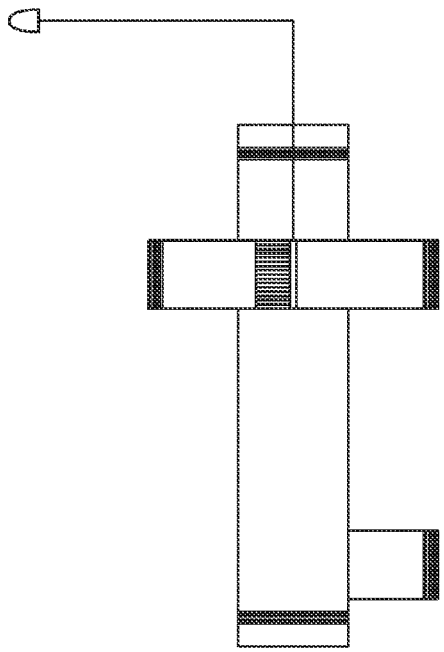
FIG. 2G shows a front elevation view of the waste separation mechanism of a recycling flush toilet in a solids evacuation position according to an embodiment of the present invention.
Figure 2D:
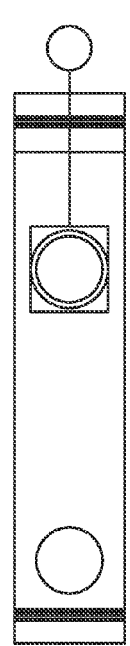
FIG. 2D shows a top plan view of the waste separation mechanism of a recycling flush toilet in a liquids evacuation position according to an embodiment of the present invention.
Figure 2F:
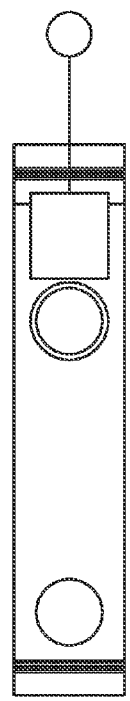
FIG. 2F shows a front elevation view of the waste separation mechanism of a recycling flush toilet in a liquids evacuation position according to an embodiment of the present invention.

With reference to FIG. 2A, the toilet 5 is in a liquids evacuation position by default as the separation mechanism is biased to the liquids evacuation position by a biasing means 17, such as a spring or an elastic band. With reference to FIG. 2B, when the handle 35 is pulled, contrary to the tension on the biasing means 17, the toilet 5 is in a solids evacuation position. Once the handle 35 is released, due to the biasing means 17, the handle 35 automatically returns to the liquids evacuation position. In the liquids evacuation position, the tray 30 is in the closed position completely inside of the box 15. When the waste reaches the lower end 75 of the toilet pipe 10, the solids are contained within the toilet pipe 10 while the liquids are evacuated into the tray 30 through the filtration element 80. The liquids travel from the side of the tray 30 adjacent to the first end 25 of the box 15 to the opposite side of the tray 30 where the liquids are evacuated into the liquids container 85 through the hole 45 in the tray floor 50 and the first hole 60 in the box floor 70. Once all of the liquids have been evacuated into the liquids container 85, the user opens the tray 30 by moving the handle 35. In the solids evacuation position, the tray 30 is fully opened and the hole 45 in the tray floor 50 is aligned with the lower end 75 of the toilet pipe 10 and the second hole 65 on the box floor 70, allowing the solids to evacuate the toilet pipe 10 by dropping downward into the solids container 90. Once all of the waste has been separated, a tank filtration element 95 such as metallic mesh or netting or some other form of mechanical filtration means located in the liquids container 85 filters the liquids as the liquid is drawn upward to the toilet tank 99 by means of an electrically- or mechanically-powered pump (not shown) which operation may be initiated by a signal received from a detection device (not shown) such as a water float or moisture sensor situated in the toilet tank 99. The tank filtration element 95 is disposable in one embodiment. The filtered liquids are reused in the toilet tank 99 after being drawn via a tube 98 from the liquids container 85 to the toilet tank 99 in preparation for the next flush.

With reference to FIGS. 3A and 3B, another embodiment of the recycling flush toilet 100 is shown. A toilet pipe 105 is connected to the base 106 of the toilet 100 and extends downward, passing through the wall of a waste separation pipe 115, the waste separation pipe 115 being sloped in a downward direction toward and in fluid communication with a liquids container 120. Within the waste separation pipe 115, the toilet pipe is in fluid communication with a slidable tray 110 having an upper end 130 and a lower end 125, wherein the lower end 125 is open, and the upper end 130 is hingedly connected to a handle 135 configured to manipulate the tray 110 laterally through the waste separation pipe 115. A solids evacuation pipe 116 is removably connected to, and extends downward from, the waste separation pipe 115 and is axially aligned with the toilet pipe 105. The lower end 140 of the toilet pipe 105 terminates at the tray floor 145, creating a flush fitment between the toilet pipe 105 and the tray floor 145. In an embodiment, the tray floor 145 may have a guide slot to assist with the alignment of the tray floor 145 and toilet pipe 105. The wall of the lower end 140 of the toilet pipe 105 has a filtration element 150 such as slits, mesh or some other form of mechanical filtration means. One skilled in the art would appreciate that other mechanical filters could be substituted while remaining within the scope of the invention.

With reference to FIG. 3A, the toilet 100 is in a liquids evacuation position by default as the separation mechanism is biased to the liquids evacuation position by a biasing means 117, such as a spring or elastic band. With reference to FIG. 3B, when the handle 135 is pulled, contrary to the tension on the biasing means 117, the toilet 100 is in a solids evacuation position. Once the handle 135 is released, due to the biasing, the handle 135 automatically returns to the liquids evacuation position. In the liquids evacuation position, the closed end 130 of the tray 110 is adjacent to the toilet pipe 105. When the waste reaches the lower end 140 of the toilet pipe 105, the solids are contained within the toilet pipe 105 while the liquids are disposed into the tray 110 through the filtration element 150. The liquids travel down through the tray 110 into the waste separation pipe 115 where the liquids are disposed into the liquids container 120. Once all of the liquids have been evacuated into the liquids container 120, the user pulls the handle 135 towards the toilet 100, causing the tray 110 to travel upward through the waste separation pipe 115 past the toilet pipe 105. The tray 110 may have a guidance system (not shown) such as a set of rails within the interior of the waste separation pipe 115 to assist with the alignment of the tray 110 and the toilet pipe 105. When the open end 125 of the tray 110 moves past the toilet pipe 105, the solids are evacuated from the toilet pipe 105, dropping downward through the solids evacuation pipe 116 into the solids container 155. Once all of the waste has been separated, a tank filtration element 160 such as metallic mesh, filters or netting or some other form of mechanical filtration means located in the liquids container 120 filters the liquids as the liquid is drawn upward to the toilet tank 165 by means of an electrically- or mechanically-powered pump (not shown), which operation may be initiated by a signal received from a detection device (not shown) such as a water float or moisture sensor situated in the toilet tank 165. The tank filtration element 160 is disposable in one embodiment. The filtered liquids are recycled and transported, via a tube 170, from the liquids container 120 to the toilet tank 165 in preparation for the next flush.

In reference to FIGS. 4A and 4B, a further embodiment of the recycling flush toilet 200 is shown. A toilet pipe 205 is connected to the base 206 of the toilet 200 and extends downward and opens into a waste separation pipe 210 that is perpendicular to the toilet pipe 205. A filtration element 225, such as a mesh or screen is directly across from and aligned with the toilet pipe 205 on the opposite wall of the waste separation pipe 210 and is removably connected to a vertical liquids evacuation pipe 230 that is axially aligned with the toilet pipe 205 and removably connected to the waste separation pipe 210 and a liquids container 235. One skilled in the art would appreciate that other mechanical filters may be substituted while remaining within the scope of the invention. A slidable handle 240 is connected to the end of a cylinder element 245 that is manipulated laterally within the waste separation pipe 210. A squeegee element (not shown) is affixed around the circumference of the cylinder 245 and sealingly engages with the interior walls of the waste separation pipe 210 as the cylinder 245 moves through the waste separation pipe 210, scraping and pushing solid waste toward a solids container 250 that is removably connected to the lower end 255 of the waste separation pipe 210.

With reference to FIG. 4A, the toilet 200 is in a liquids evacuation position at rest as the separation mechanism is biased to the liquids evacuation position by a biasing device 201, such as a spring or elastic band. With reference to FIG. 4B, when the handle 240 is pulled, contrary to the tension on the biasing device 201, the toilet 200 is in a solids evacuation position. Once the handle 240 is released, due to the biasing, the handle 240 automatically returns to the liquids evacuation position. In the liquids evacuation position, the filtration element 225 is aligned with the toilet pipe 205. As the waste exits the toilet pipe 205, it falls onto the filtration element 225 where the liquids are disposed through the filtration element 225, down through the liquids evacuation pipe 230 and into the liquids container 235. Once the liquids have drained from the waste, the user slides the handle 240 toward the toilet 200. As the handle 240 moves toward the toilet 200, it causes the cylinder 245 that is sealingly engaged with the walls of the waste separation pipe 210 via the squeegee element (not shown) to move through the waste separation pipe 210 toward the solids container 250. As the cylinder 245 moves through the waste separation pipe 210 towards the end 255 of the pipe that is removably connected to the solids container 250, the squeegee element (not shown) scrapes the waste from the pipe walls. Once the handle 240 has been fully engaged, i.e. it has been moved as far towards the toilet 200 as possible, the solids are evacuated into the solids container 250. Once all of the waste has been separated, a filtration element 260 such as metallic mesh or netting or some other form of mechanical filtration means located in the liquids container 235 filters the liquids as the liquid is drawn upward to the toilet tank 265 by means of an electrically- or mechanically-powered pump (not shown), which operation may be initiated by a signal received from a detection device (not shown) such as a water float or moisture sensor situated in the toilet tank 265. The tank filtration element 260 is disposable in one embodiment. The filtered liquids are recycled, via a tube 270, from the liquids container 235 to the toilet tank 265 in preparation for the next flush.

Figure 5B:
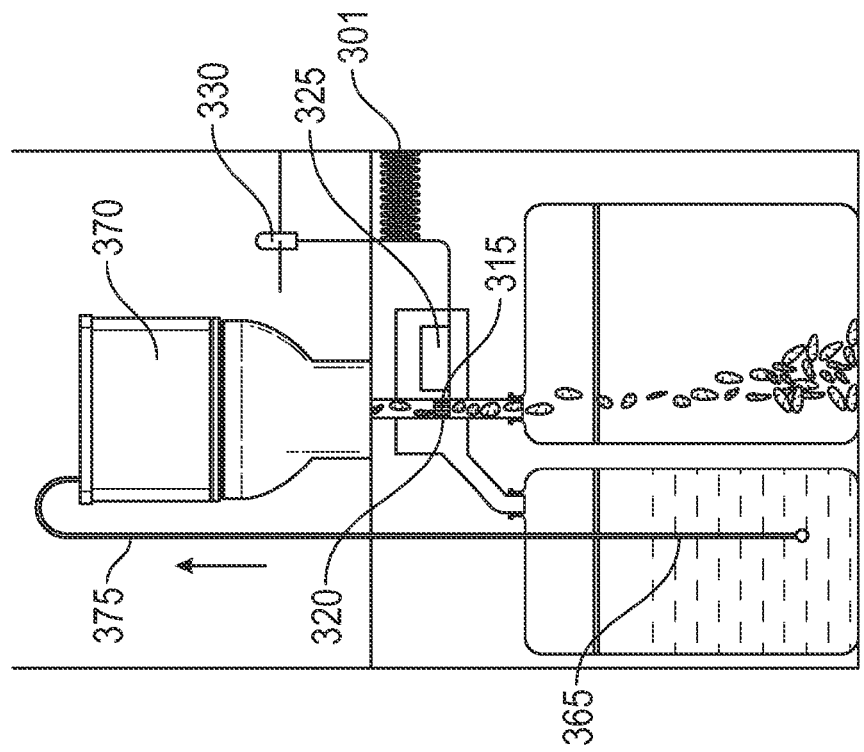
FIG. 5B shows a transparent front elevation view of a recycling flush toilet in the solids evacuation position according to an embodiment of the present invention.
Figure 5A:
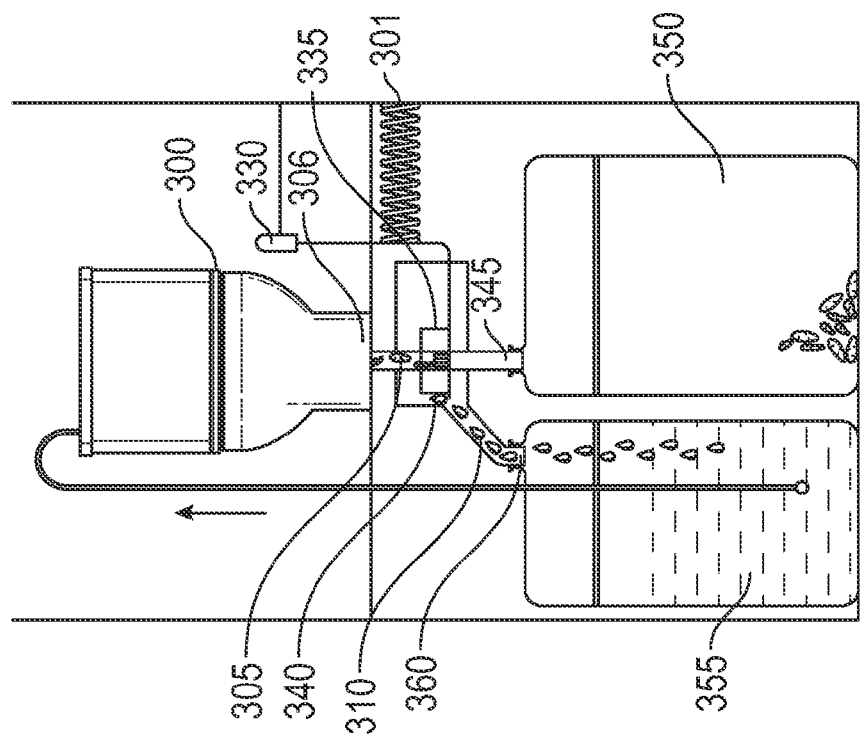
FIG. 5A shows a transparent front elevation view of a recycling flush toilet in the liquids evacuation position according to an embodiment of the present invention.

With reference to FIGS. 5A and 5B, a further embodiment of the recycling flush toilet 300 is shown. A toilet pipe 305 is connected to the base 306 of the toilet 300 and extends downward into a waste separation pipe 310 that is perpendicular to the toilet pipe 305. The wall of the lower end 315 of the toilet pipe 305 has a filtration element 320 such as slits, mesh or some other form of mechanical filtration means. One skilled in the art would appreciate that other mechanical filters could be substituted while remaining within the scope of the invention. The lower end 315 of the toilet pipe 305 sealingly engages with the floor 321 of a tray 325, having a first end 335 and a second end 340, wherein the first end is connected to a handle 330 that allows a user to manipulate the movement of the tray 325 laterally within the waste separation pipe 310, and the second end 340 is open. In an embodiment, the tray floor 321 is configured with a guide slot (not shown) to assist with the alignment of the tray floor 321 and toilet pipe 305. The tray 325 is slightly sloped, with the first end 335 being slightly more elevated than the second end 340. A solids evacuation pipe 345 passes through the wall of the waste separation pipe 310 below the tray 325 and is axially aligned with the toilet pipe that passes through the opposite wall of the waste separation pipe 310 into the solids container 350. A liquids container 355 is removably connected to the lower end 360 of the waste separation pipe 310.

With reference to FIG. 5A, the toilet 300 is in a liquids evacuation position by default as the separation mechanism is biased to the liquids evacuation position by a biasing means 301, such as a spring or an elastic band. With reference to FIG. 5B, when the handle 330 is pulled, contrary to the tension of the biasing means 301, the toilet 300 is in a solids evacuation position. Once the handle 330 is released, due to the biasing, the handle 330 automatically returns to the liquids evacuation position. In the liquids evacuation position, the tray 325 is aligned with the toilet pipe 305. When the waste reaches the lower end 315 of the toilet pipe 305, the solids are contained within the toilet pipe 305 while the liquids are evacuated into the tray 325 through the filtration element 320. The liquids travel through the tray 325 into the waste separation pipe 310 where the liquids are evacuated into the liquids container 355. Once all of the liquids have been evacuated into the liquids container 355, the user pulls the handle 330 towards the toilet 300, causing the tray 325 to travel through the waste separation pipe 310 past the toilet pipe 305. The tray 325 may have a guidance system (not shown) such as a set of rails within the interior of the waste separation pipe 310 to assist with the alignment of the tray 325 and the toilet pipe 305. When the second end 340 of the tray 325 travels past the toilet pipe 305, the solids are evacuated from the toilet pipe 305 by dropping downward through the solids evacuation pipe 345 into the solids container 350. Once all of the waste has been separated, a filtration element 365 such as metallic mesh or netting or some other form of mechanical filtration means located in the liquids container 355 filters the liquids as the liquid is drawn upward to the toilet tank 370 by means of an electrically- or mechanically-powered pump (not shown), which operation may be initiated by a signal received from a detection device (not shown) such as a water float or moisture sensor situated in the toilet tank 370. The tank filtration element 365 is disposable in one embodiment. The filtered liquids are recycled, via a tube 375, from the liquids container 355 to the toilet tank 370 in preparation for the next flush.

Figure 6B:
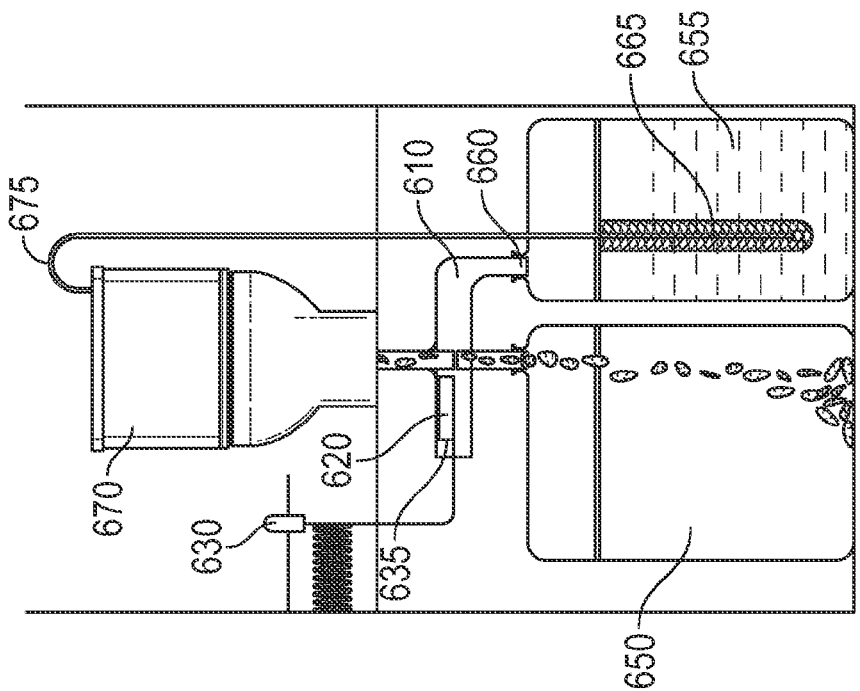
FIG. 6B shows a transparent front elevation view of a recycling flush toilet in the solids evacuation position according to an embodiment of the present invention.
Figure 6A:
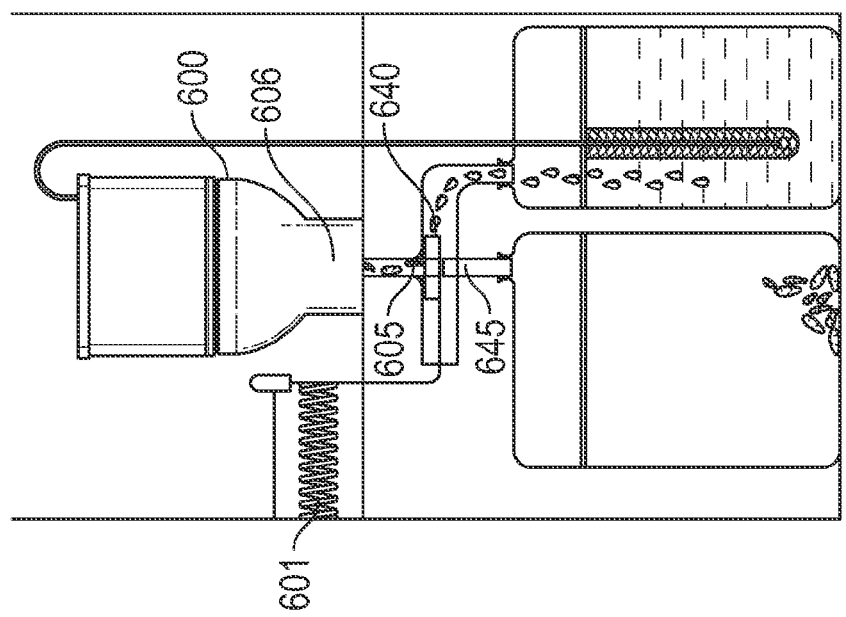
FIG. 6A shows a transparent front elevation view of a recycling flush toilet in the liquids evacuation position according to an embodiment of the present invention.

With reference to FIGS. 6A and 6B, a further embodiment of the recycling flush toilet 600 is shown. A toilet pipe 605 is connected to the base 606 of the toilet 600 and extends downward into a waste separation pipe 610 that is perpendicular to the toilet pipe 605. Inside of the waste separation pipe 610 is a box 615, having a first end 635 and a second end 640, wherein the first end is connected to a handle 630 that allows a user to manipulate the movement of the box 615 laterally within the waste separation pipe 610, and the second end 640 is open. The top side 616 of the box 615 has a filtration element (not shown) such as slits, a mesh or a screen. The underside of the box floor 620 may have a guide slot (not shown) to assist with the alignment of the box floor 625 and the solids evacuation pipe 645. The box 615 is slightly sloped, with the first end 635 being slightly more elevated than the second end 640. A solids evacuation pipe 645 passes through the wall of the waste separation pipe 610 below the box 615 and is axially aligned with the toilet pipe that passes through the opposite wall of the liquids evacuation pipe 610 into the solids container 650. A liquids container 655 is removably connected to the lower end 660 of the waste separation pipe 610.

With reference to FIG. 6A, the toilet 600 is in a liquids evacuation position by default as the separation mechanism is biased to the liquids evacuation position by a biasing means 601, such as a spring or an elastic band. With reference to FIG. 6B, when the handle 630 is pulled, contrary to the tension of the biasing means 601, the toilet 600 is in a solids evacuation position. Once the handle 640 is released, due to the biasing, the handle 630 automatically returns to the liquids evacuation position. In the liquids evacuation position, the box 615 is in communication with the toilet pipe 605. The liquids travel through the filtration element (not shown) on the top of the box 615 into the interior of the box 615. Due to the slope of the box 615, the liquids flow out of the box 615 into the waste separation pipe 610 where the liquids are evacuated into the liquids container 655.

Once all of the liquids have been evacuated into the liquids container 655, the user pulls the handle 630 towards the toilet 600, causing the box 615 to travel through the waste separation pipe 610 past the solids evacuation pipe 645. The box 615 may have a guidance system (not shown)

such as a set of rails within the interior of the waste separation pipe 610 to assist with the alignment of the box 615 and the solids evacuation pipe 645. When the open end 640 of the box 615 travels past the solids evacuation pipe 645, the solids are evacuated from the toilet pipe 605 by dropping downward through the solids evacuation pipe 645 into the solids container 650. Once all of the waste has been separated, a tank filtration element 665 such as metallic mesh or netting or some other form of mechanical filtration means located in the liquids container 655 filters the liquids as the liquid is drawn upward to the toilet tank 670 by means of an electrically- or mechanically-powered pump (not shown), which operation may be initiated by a signal received from a detection device (not shown) such as a water float or moisture sensor situated in the toilet tank 670. The tank filtration element 665 is disposable in one embodiment. The filtered liquids are recycled, via a tube 675, from the liquids container 655 to the toilet tank 670 in preparation for the next flush.

Figure 7A:
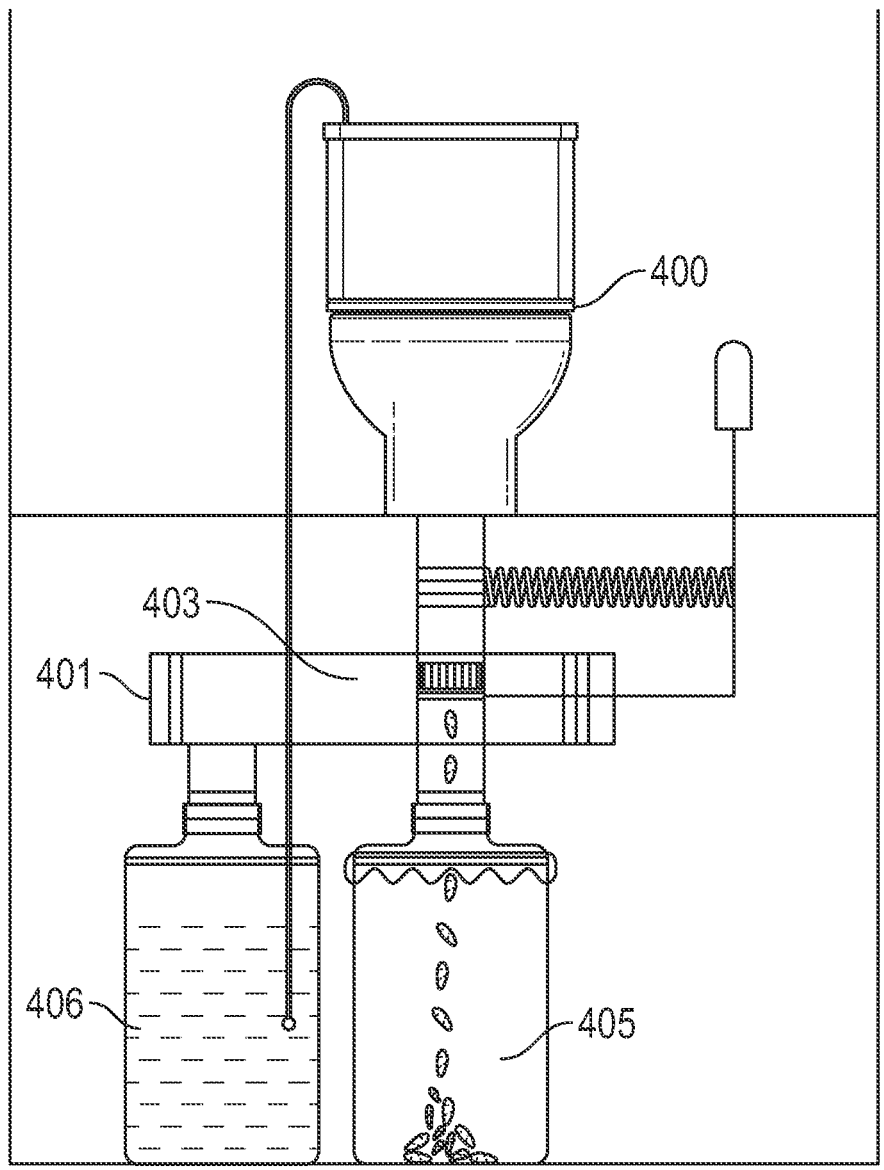
FIG. 7A shows a transparent front elevation view of a recycling flush toilet in the solids evacuation position with a disposable liner for removing and disposing of solid waste according to an embodiment of the present invention.
Figure 7B:
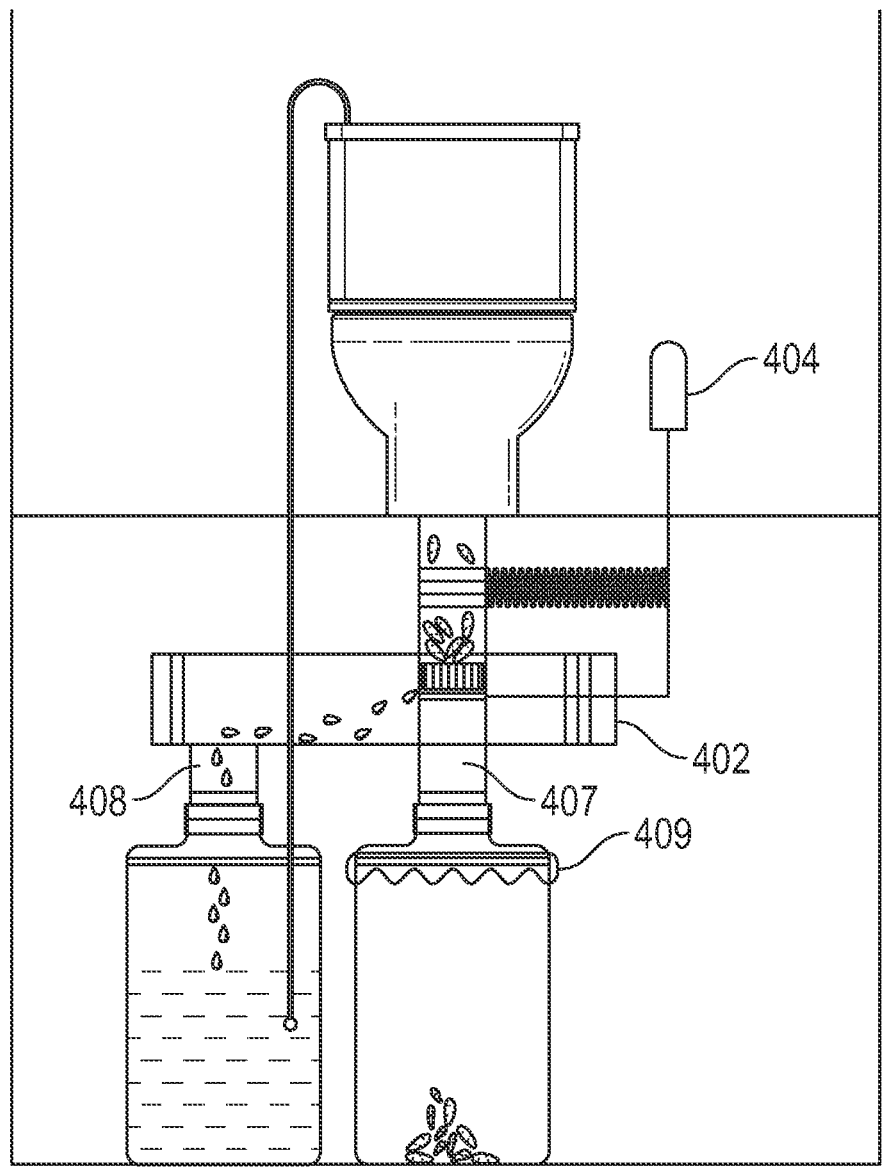
FIG. 7B shows a transparent front elevation view of a recycling flush toilet in the liquids evacuation position with a disposable liner for removing and disposing of solid waste according to an embodiment of the present invention.
Figure 7C:
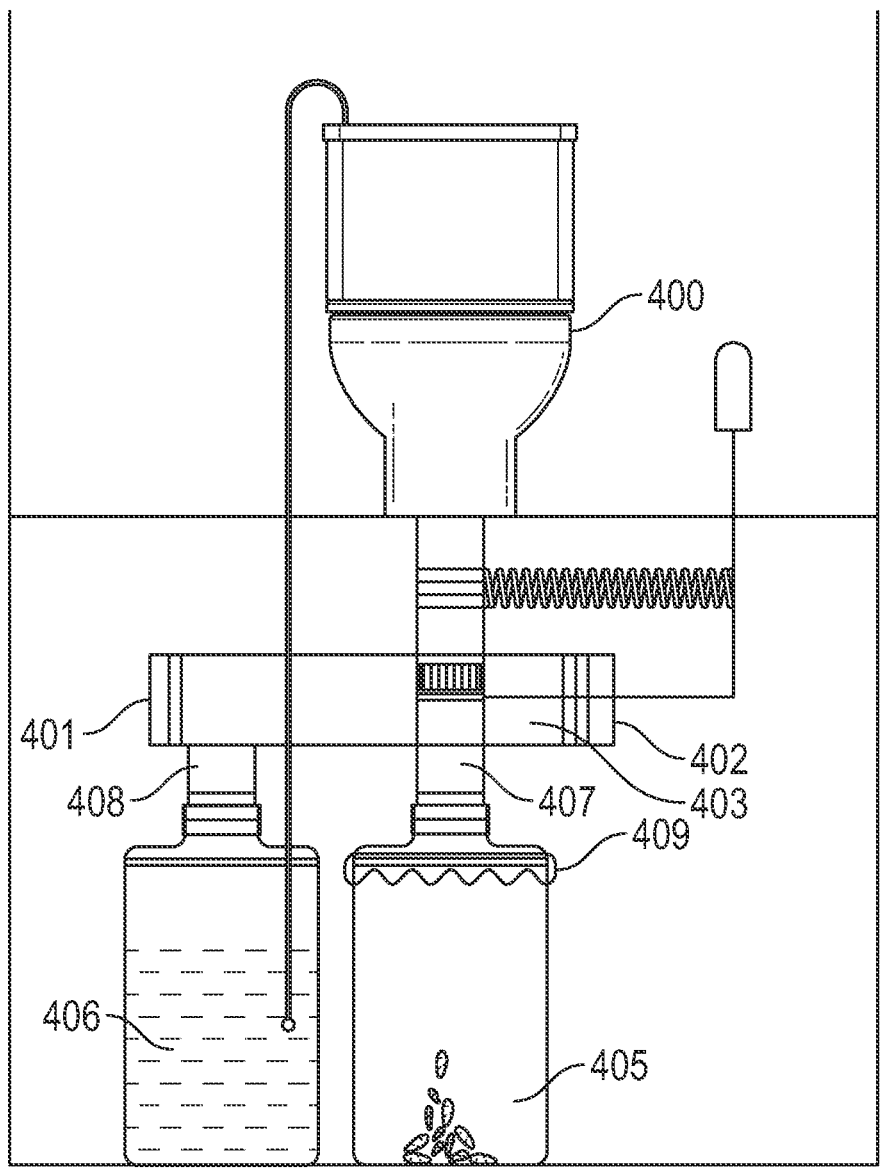
FIG. 7C shows a transparent front elevation view of an assembled recycling flush toilet with a disposable liner for removing and disposing of solid waste according to an embodiment of the present invention.
Figure 7D:
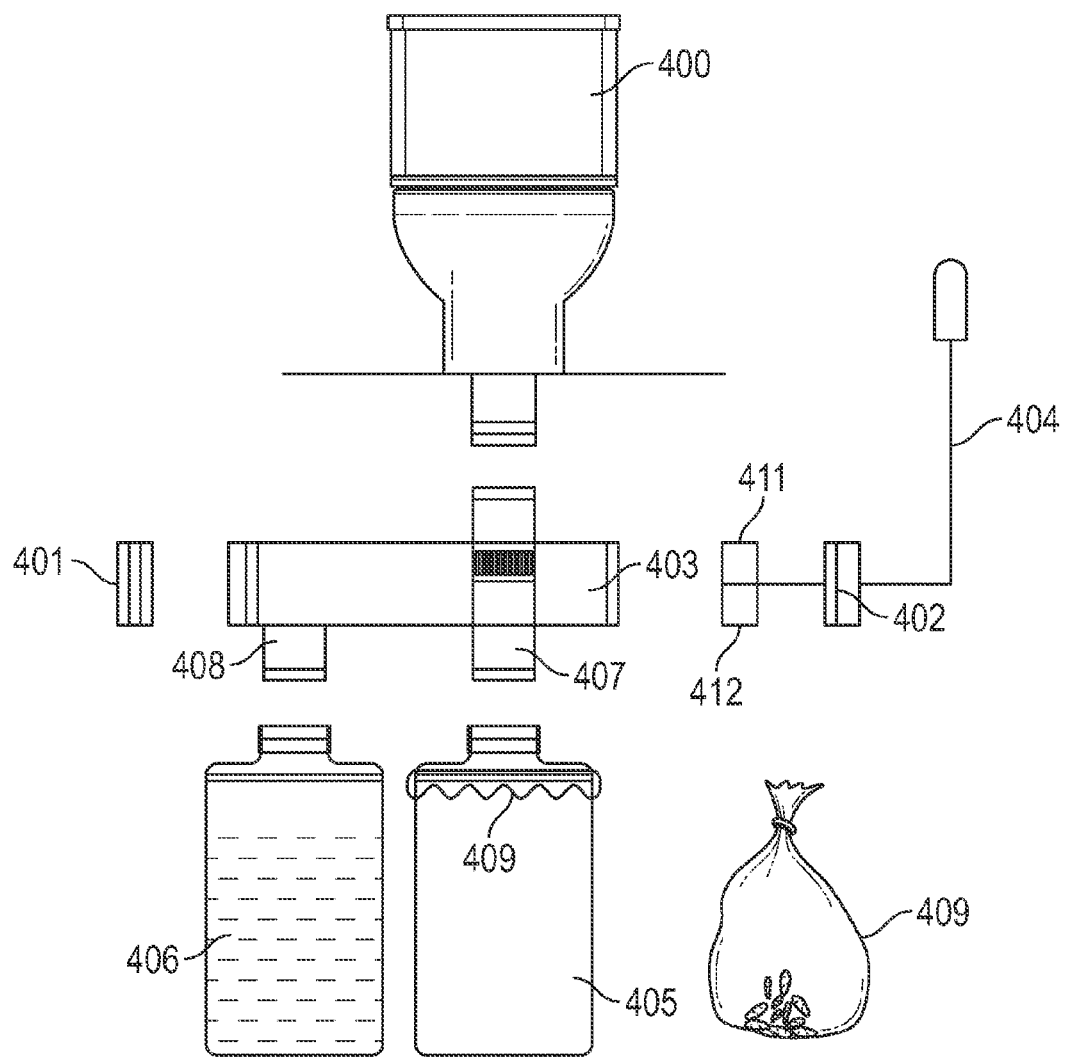
FIG. 7D shows a transparent front elevation view of a disassembled recycling flush toilet with a disposable liner for removing and disposing of solid waste according to an embodiment of the present invention.

With reference to FIGS. 7A through 7D, an embodiment of the recycling flush toilet 400 is shown both assembled and disassembled into its component parts to demonstrate an example configuration of connectivity amongst the various parts. At each connection point, the various components are removably attached to one another via mated threading, tension clamps or some other non-permanent connection device, allowing for quick and easy removal and/or installation of replacement parts during maintenance and/or repair. In an embodiment, the recycling flush toilet is configured to be disassembled for ease of maintenance within three minutes on a daily or weekly basis. For example, in one embodiment of the recycling flush toilet, the ends 401, 402 of the waste separation pipe 403 are removably attached to the separation pipe 403, allowing for easy repairs to the interior of the separation pipe 403, for example, to clear a blockage within the separation pipe 403 or to repair and/or replace a broken component such as the handle 404 within the separation pipe 403. With reference to FIG. 7D in particular, the tray may have upward flanges 411, for covering the toilet pipe, or downward flanges 412 for covering the solids evacuation pipe 407. The handle 404 penetrates and slides through the end 402 and attaches to the tray. As a further example, in one embodiment of the recycling flush toilet 400, the solids evacuation pipe 407 and a liquids evacuation pipe 408 extend downward from within the waste separation pipe 403, passing through the wall of the waste separation pipe 403, and the lower ends of the solids and liquids evacuation pipes 407, 408 extend downward into the solids and liquids containers 405, 406, respectively. The solids and liquids containers 405, 406 are removably connected to the solids and liquids evacuation pipes 407, 408, respectively, allowing for quick and easy removal of waste. The solids and liquids containers 405, 406 may be removed, recycled and replaced with new containers; or the liquids container 406 may be temporarily disconnected and reconnected for waste disposal, and the solids container 405 can be disconnected and cleared via removal and replacement of a waste liner 409 configured for the solids container 405. The waste can then be recycled, used as fertilizer or disposed of in an environmentally friendly way.

Figure 8:
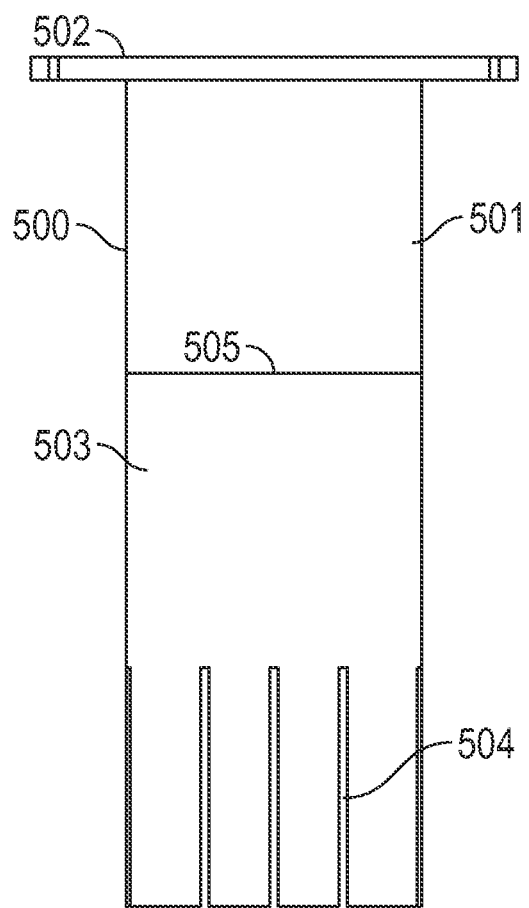
FIG. 8 shows a toilet pipe with a filtration element configured for a recycling flush toilet according to an embodiment of the present invention.

With reference to FIG. 8, an embodiment of the recycling flush toilet's toilet pipe 500 is shown. The toilet pipe 500 consists of two pieces, an upper end 501 and a lower end 503 that are removably attached to one another at a junction point 505 via a connection means (not shown) such as mated threading or tension clamps, allowing for quick and easy removal and/or installation of replacement parts during maintenance and/or repair. The toilet pipe's upper end 501 has a flange 502 that rests on, and is connected to, the recycling flush toilet structure floor (not shown). The wall of the toilet pipe's lower end 503 has a pipe filtration element 504 such as slits, mesh, sieves, screening or some other form of mechanical filtration means. In one embodiment the filtration element is disposable and replaceable. In another embodiment, a screen filter may use a backwash cycle to clean the filter, wherein the fluid is passed through the filter in a reverse direction to clean the filter.

Figure 9A:
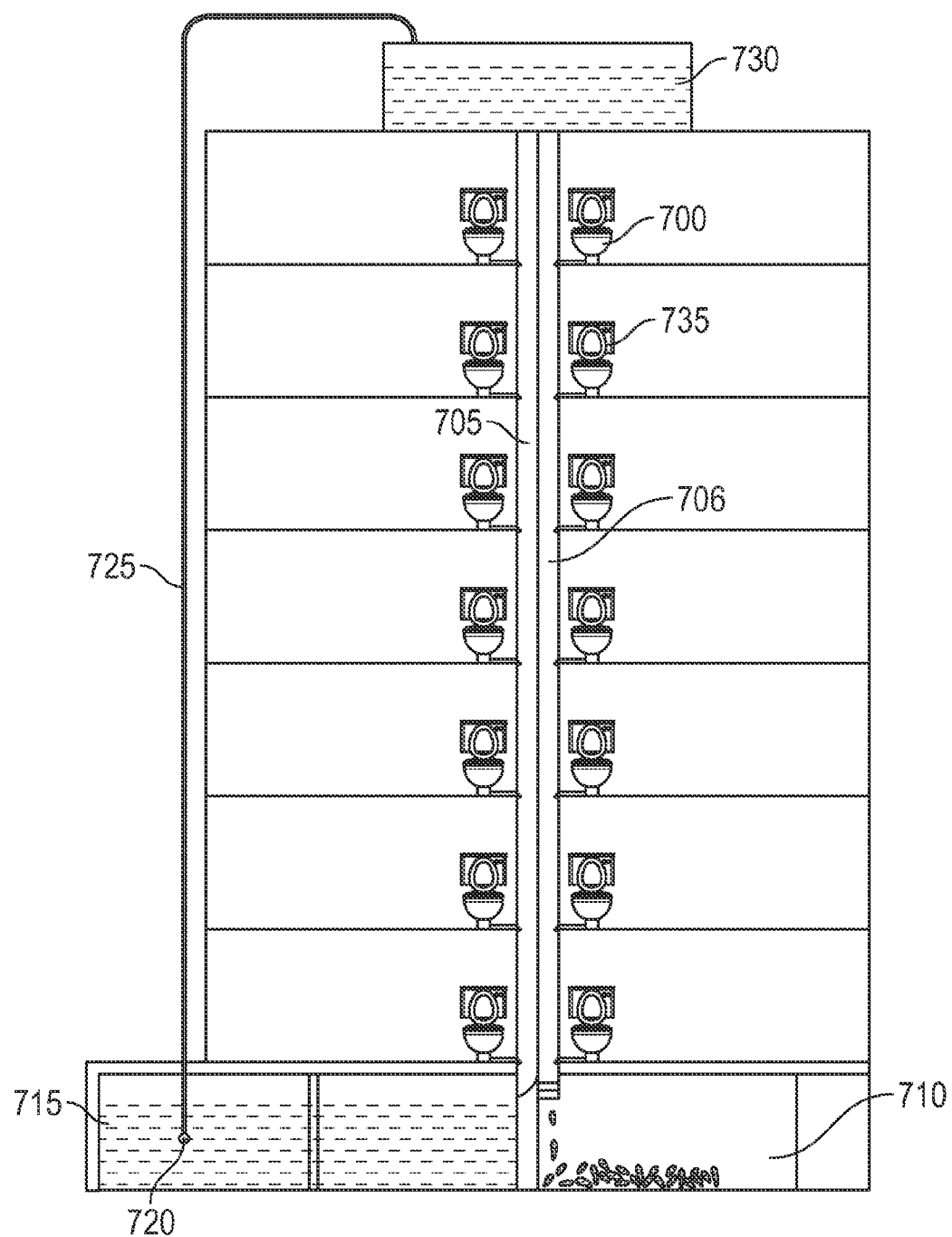
FIG. 9A shows a recycling flush toilet system for high-rise buildings according to an embodiment of the present invention having two hose pipes, one for the solids and the other for the liquids.
Figure 9B:
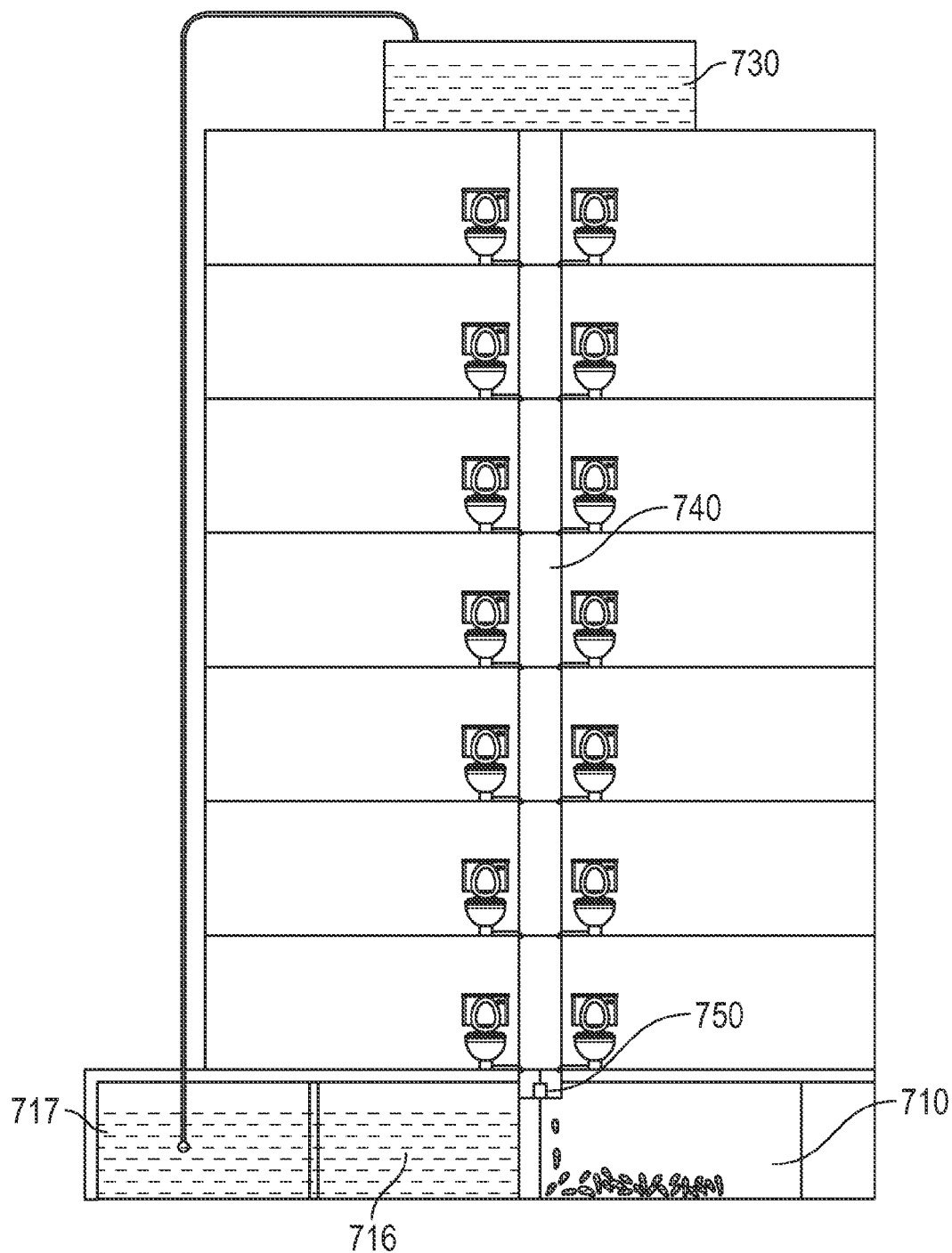
FIG. 9B shows a recycling flush toilet system for high-rise building according to an embodiment of the present invention having a single hose pipe for the solids and the liquids.

With reference to FIGS. 9A and 9B, alternative embodiments of a recycling flush toilet system for high-rise buildings is shown. The recycling flush toilet system can be a viable substitute for standard toilets in high-rise buildings in developing countries that have electricity but a limited supply of water. With reference to FIG. 9A, used water from the bath tubs (not shown) and sinks (not shown) drains directly into a central waste water pipe 705 that descends down through the building in which the recycling flush toilet system is located. A separation process, similar to the squeegee model described above, is made in two central containers, one for solids 710 and one for liquids 715. During the water flush, the liquids go directly to the liquids container 715 and the solids are pushed to the solids container 710 through a automatic system that blocks incoming solids during the process. The system also recycles water from the kitchen sink (not shown), the bathroom sink (not shown) and bathtub (not shown). Waste from the toilets 700 is separated within each unit's separate drainage pipes (not shown). As the toilet 700 is flushed, the waste enters the unit's waste separation pipe (not shown) where the water is evacuated through a filtration element (not shown) into the central waste water pipe 705 where it flows down through the building's central waste water pipe 705 and is deposited into the liquids container 715 at the base of the building. In an alternative embodiment, the liquids container 715 is separated into a first chamber and a second chamber, the first chamber containing chemicals for treating the incoming waste water and the second chamber holding the treated liquids for recycling. In further reference to FIG. 9A, once the water is fully evacuated from the waste separation pipe (not shown), the solids are evacuated from the waste separation pipe (not shown) by pulling a handle (not shown) that opens the filtration element (not shown). Once evacuated from the waste separation pipe (not shown) the solids evacuate down through the building's central solids waste pipe 706 where it is deposited into the solids container 710 at the base of the building.

With reference to FIG. 9B, in an alternative embodiment, the central waste water pipe 705 and the central solids waste pipe 706 described above in reference to FIG. 9A are configured into a central waste separation pipe 740 having a lower end 745 with a waste filtration element 750, wherein solids and liquids travel down through the central waste separation pipe 740 together. Once the waste reaches the bottom of the central waste separation pipe 740, the solids are contained within the central waste separation pipe 740 while the liquids are disposed through the waste filtration element 750 into a first liquids container 716 containing chemicals for treating the waste water. The treated liquids are then transferred to a second liquids container 717 for reuse in the recycling flush toilet system. Once all of the liquids have been disposed into the first liquids container 716, the user releases the solids via a filter actuating means (not shown), such as an electronic button, allowing the solids to be disposed into the solids container 710. In either embodiment described above, once all of the waste has been separated, a filtration element 720 such as metallic mesh or netting or some other form of mechanical filtration means located in the liquids container 715 filters the liquids as the liquid is drawn upward to the building's central water holding tank 730 by means of an electrically- or mechanically-powered pump (not shown), which operation may be initiated by a signal received from a detection device (not shown) such as a water float or moisture sensor situated in each unit's toilet tank 735. The liquids container filtration element 720 is disposable in one embodiment. The filtered liquids are recycled, via a pipe 725, from the liquids container 715 to the building's central water holding tank 730 that distributes water via internal plumbing (not shown) connecting the holding tank 730 to the individual units' toilet tanks 735 in preparation for the next flush.

The invention claimed is:

1. A recycling flush toilet comprising:
  a. a receptacle configured to receive human waste;
  b. a liquids holding tank for flushing the receptacle;
  c. a base for supporting the receptacle;
  d. a toilet pipe having an upper end and a lower end, wherein the upper end is in fluid communication with the base of the toilet and extends downwards;
  e. a waste separation pipe extending out from the lower end of the toilet pipe, having a first end, wherein the lower end of the toilet pipe extends into the separation pipe near the first end;
  f. a filtration element at the lower end of the toilet pipe for separating solids and liquids;
  g. a solids container axially aligned and in fluid communication with the toilet pipe; and
  h. a liquids container in fluid communication with the separation pipe and adjacent to the solids container, wherein liquids within the liquids container are used to flush the toilet,
  wherein the filtration element separates the human waste into liquid and solid components, and wherein the liquid component is disposed into the liquids container, and the solid component is disposed into the solids container.

2. The recycling flush toilet of claim 1, further comprising:
  a. a slidable tray that is in fluid communication with the lower end of the toilet pipe; and
  b. a handle connected to the tray configured to manipulate the movement of the tray,
  wherein the tray is configured to move laterally from a liquids evacuation position wherein the tray blocks the lower end of the toilet pipe, to a solids evacuation position wherein the tray is moved past the lower end of the toilet pipe and is no longer blocking the lower end of toilet pipe.

3. The recycling flush toilet of claim 1, further comprising:
  a. a solids evacuation pipe having an upper end and a lower end that is axially aligned with the toilet pipe, wherein the upper end extends downward from within the waste separation pipe, and the lower end extends into the solids container;
  b. a slidable tray that is in fluid communication with the upper end of the solids evacuation pipe; and
  c. a handle connected to the tray for manipulating the movement of the tray,
  wherein the tray is movable from a liquids evacuation position blocking the upper end of the solids evacuation pipe to a solids evacuation position wherein the tray is no longer blocking the upper end of solids evacuation pipe.

4. The recycling flush toilet of claim 1, further comprising:
  a. a solids evacuation pipe having an upper end and a lower end that is axially aligned with the toilet pipe, wherein the upper end extends downward from within the waste separation pipe, and the lower end extends into the solids container; and
  b. a liquids evacuation pipe having an upper end and a lower end, wherein the upper end extends downward from within the waste separation pipe, and the lower end extends into the liquids container,
  wherein both the solids evacuation pipe and the liquids evacuation pipe are removably connected to both the waste separation pipe and the solids and liquids containers, respectively.

5. The recycling flush toilet of claim 2 wherein in the liquids evacuation position the solids are contained within the lower end of the toilet pipe while the liquids pass through the filter and into the liquids container, and wherein in the solids evacuation position the solids are disposed into the solids container.

6. The recycling flush toilet of claim 2 wherein the tray is biased to a liquids evacuation position by a biasing means, wherein when the handle is pulled, the tray slides to a solids evacuation position, and wherein once the handle is released, the handle returns to the liquids evacuation position.

7. The recycling flush toilet of claim 1, further comprising a filtration means within the liquids container configured to filter liquid moving from the liquids container to the holding tank, and wherein chemical products are added to treat the used water.

8. The recycling flush toilet of claim 1, further comprising a manual or electrical powered water pump configured to pump liquid from the liquids container to the holding tank.

9. The recycling flush toilet of claim 1, wherein the upper end of the toilet pipe is removably connected to the lower end of the toilet pipe, and wherein the lower end of the toilet pipe is removably connected to the waste separation pipe, and wherein the waste separation pipe is removably connected to the solids and liquids containers.

10. The recycling flush toilet of claim 1, further comprising a removable waste liner within the solids container.

11. The recycling flush toilet of claim 1, wherein the ends of the waste separation pipe are removably connected to the waste separation pipe.

12. The recycling flush toilet of claim 2, wherein the filtration element is a mechanical filter selected from the group consisting of axially aligned slits around the circumference of the lower end of the toilet pipe, small holes around the lower end of the toilet pipe, a sieve, a mesh or a netting.

13. The recycling flush toilet of claim 1, further comprising a structure around the toilet, configured to house at least one recycling flush toilet, wherein the structure is configured to be portable.

14. The recycling flush toilet of claim 1, wherein the fluids holding tank is mounted on a building roof, and the liquids container and solids container are fixed within the base of the building, wherein the toilet pipe is connected to a plurality of toilets within the building, said toilets flush waste into the toilet pipe and the waste is separated into liquids and solids.

15. The toilet of claim 14, wherein the toilet pipe comprises a liquid pipe and a solids pipe and wherein the waste is separated in each toilet.

16. A recycling flush toilet comprising:
  a. a receptacle configured to receive human waste;
  b. a liquids holding tank for flushing the receptacle;
  c. a base for supporting the receptacle;
  d. a toilet pipe having an upper end and a lower end, wherein the upper end is in fluid communication with the base of the toilet and extends downwards;
  e. a filtration element at the lower end of the toilet pipe for separating solids and liquids;
  f. a solids container axially aligned with the toilet pipe;
  g. a liquids container adjacent to the solids container;
  h. a box extending out from the lower end of the toilet pipe, having an open end, wherein the lower end of the toilet pipe extends into a first hole in the top of the box near the open end, and wherein a second hole in the bottom of the box is axially aligned with the liquids container, and wherein a third hole in the bottom of the box is axially aligned with the toilet pipe and the solids container; and
  i. a slidable tray in fluid communication with the lower end of the toilet pipe within the box configured to block solid waste within the toilet pipe while liquids pass through the filtration element, wherein once the fluids have drained, the tray is moved out of the box to unblock the toilet pipe, allowing the solid waste to be disposed in to the solids container.

17. The recycling flush toilet of claim 16, wherein the filtration element comprises a cut away hose pipe facing the solids container having a separator in between configured to stop liquids from going into the solids container, wherein when the cut away is blocked by the separator, the solids are captured inside the pipe while the liquids go directly to the related container.

18. The recycling flush toilet of claim 16 further comprising a garbage bag inside the solids container in order to better manage human waste which can be burned, collected as domestic garbage for city garbage collection or compost as fertilizers, and wherein the human wasted management can also be handled by a public or private recycling facility where citizens can take their solids for a new one at a competitive price.

19. The recycling flush toilet of claim 16 wherein the toilet forms a sealed system to avoids lingering odors and negative visual impacts of a blue portable latrine.

20. A recycling flush toilet comprising:
  a. a receptacle configured to receive human waste;
  b. a liquids holding tank for flushing the receptacle;
  c. a base for supporting the receptacle;
  d. a toilet pipe having an upper end and a lower end, wherein the upper end is in fluid communication with the base of the toilet and extends downwards;
  e. a waste separation pipe extending out from the lower end of the toilet pipe, having a first end, wherein the lower end of the toilet pipe extends into the separation pipe near the first end;
  f. a liquids container axially aligned and in fluid communication with the toilet pipe;
  g. a solids container in fluid communication with the separation pipe and adjacent to the liquids container;
  h. a solids evacuation pipe having an upper end and a lower end that is axially aligned with the toilet pipe and extends downward from within the waste separation pipe into the solids container;
  i. a filtration element at the upper end of the solids evacuation pipe for separating solids and liquids;
  j. a cylinder element within the waste separation pipe having squeegee elements affixed around its circumference, wherein the squeegee elements sealingly engage with the interior walls of the waste separation pipe; and
  k. a handle connected to the cylinder element, configured to manipulate the movement of the cylinder element back and forth through the waste separation pipe,
  wherein the filtration element is configured to separate the human waste into liquid and solid components, and wherein once the liquid component is disposed into the liquids container, the solids are disposed into the solids container by moving the cylinder element through the waste separation pipe toward the solids container.

\* \* \* \* \*